United States Patent

Okuhata (10) Patent No.: US 10,122,395 B2
(45) Date of Patent: Nov. 6, 2018

(54) FM RECEPTION DEVICE, FM RECEPTION METHOD FOR RECEIVING FM SIGNALS

(71) Applicant: JVC KENWOOD Corporation, Yokohama-shi, Kanagawa (JP)

(72) Inventor: Yasuhide Okuhata, Yokohama (JP)

(73) Assignee: JVC KENWOOD Corporation, Tokyo (JP)

( * ) Notice: Subject to any disclaimer, the term of this patent is extended or adjusted under 35 U.S.C. 154(b) by 0 days.

(21) Appl. No.: 15/635,492

(22) Filed: Jun. 28, 2017

(65) Prior Publication Data

US 2017/0302311 A1 Oct. 19, 2017

Related U.S. Application Data

(63) Continuation of application No. PCT/JP2015/081362, filed on Nov. 6, 2015.

(30) Foreign Application Priority Data

Feb. 23, 2015 (JP) ................................ 2015-032459

(51) Int. Cl.
*H04B 1/16* (2006.01)
*H04B 1/10* (2006.01)

(52) U.S. Cl.
CPC ................. *H04B 1/10* (2013.01); *H04B 1/16* (2013.01)

(58) Field of Classification Search
CPC .... H04B 10/548; H04B 10/5563; H04B 1/10; H04B 1/16
USPC ............ 455/205, 307, 130, 142, 334, 23, 42
See application file for complete search history.

(56) References Cited

U.S. PATENT DOCUMENTS

| 4,944,025 A | 7/1990 | Gehring et al. | |
| 6,725,023 B2* | 4/2004 | Kasperkovitz | H03D 3/245 375/324 |
| 7,860,479 B2* | 12/2010 | Suzuki | H04B 1/10 455/307 |
| 8,055,225 B2* | 11/2011 | Ojima | H04B 1/1027 455/205 |
| 8,185,082 B2* | 5/2012 | Meijer | H04B 1/26 455/276.1 |

(Continued)

FOREIGN PATENT DOCUMENTS

| JP | H03-016349 A | 1/1991 |
| JP | H07506951 A | 7/1995 |

(Continued)

*Primary Examiner* — Sonny Trinh
(74) *Attorney, Agent, or Firm* — Brundidge & Stanger, P.C.

(57) ABSTRACT

A first local oscillator generates a modulation signal of a predetermined frequency. A second local oscillator outputs a local oscillation signal frequency-modulated by using the modulation signal from the first local oscillator. A quadrature detection unit subjects an FM signal to quadrature detection by using the local oscillation signal output from the second local oscillator and outputs a base band signal. A first reduction unit and a second reduction unit reduce a direct current component contained in the base band signal. A correction unit restores the direct current component by correcting the base band signal such that the base band signal is centered around an origin of a polar coordinate system on an IQ plane. An FM detection unit subjects the corrected base band signal to FM detection and generates a detection signal.

4 Claims, 10 Drawing Sheets

(56) References Cited

U.S. PATENT DOCUMENTS

| | | | | |
|---|---|---|---|---|
| 8,260,233 | B2 * | 9/2012 | Kobayashi | H04B 1/1036 455/214 |
| 9,391,814 | B2 * | 7/2016 | Okuhata | H04L 25/0262 |
| 9,461,587 | B2 * | 10/2016 | Okuhata | H03D 3/22 |
| 9,503,296 | B2 * | 11/2016 | Okuhata | H04L 25/06 |

FOREIGN PATENT DOCUMENTS

| | | |
|---|---|---|
| JP | H09-200072 A | 7/1997 |
| JP | H10-112734 A | 4/1998 |
| JP | H11-340863 A | 12/1999 |
| JP | 2010114508 A | 5/2010 |
| JP | 2011029717 A | 2/2011 |

* cited by examiner

FM RECEPTION DEVICE, FM RECEPTION METHOD FOR RECEIVING FM SIGNALS

CROSS-REFERENCE TO RELATED APPLICATION

This application is based upon and claims the benefit of priority from the prior Japanese Patent Application No. 2015-032459, filed on Feb. 23, 2015, the entire contents of which are incorporated herein by reference.

BACKGROUND

1. Field

The present invention relates to reception technologies and, more particularly, to FM reception devices and FM reception methods for receiving FM signals.

2. Description of the Related Art

Direct conversion Frequency Modulation (FM) reception devices convert an RF signal into a base band signal by quadrature detection and subsequently amplify the base band signal using an amplifier. Because an unnecessary direct current component is output by the amplifier, the FM reception device reduces the direct current component contained in the base band signal using a coupling capacitor. Further, the FM reception device subjects the base band signal in which the direct current component is reduced to FM detection (see, for example, patent document 1).

Patent Document 1: JP3-16349

If a direct conversion FM reception device is provided with a coupling capacitor, not only an unnecessary direct current component from the amplifier is reduced but also a direct current component and a low frequency component in the base band signal may be reduced. Such reduction creates distortion components that remain after FM detection. Further, in the event that an unmodulated signal is received and the frequency of the received signal is identical to that of the local oscillation signal, the base band signal will be comprised only of a direct current component so that the entirety of the signal will be cut in the coupling capacitor. As a result, only the noise received in the antenna or the noise generated inside are subject to FM detection so that the signal from the FM detection will be comprised only of the noise.

SUMMARY

To address the above issue, an FM reception device according to an embodiment comprises: a modulation frequency generation unit that generates a modulation signal of a predetermined frequency; a local oscillator that outputs a local oscillation signal frequency-modulated by using the modulation signal from the modulation frequency generation unit; a quadrature detection unit that subjects an FM signal to quadrature detection by using the local oscillation signal output from the local oscillator and outputs a base band signal; a reduction unit that reduces a direct current component contained in the base band signal output from the quadrature detection unit; a correction unit that restores the direct current component by correcting the base band signal such that the base band signal is centered around an origin of a polar coordinate system on an IQ plane; an FM detection unit that subjects the base band signal corrected by the correction unit to FM detection and generates a detection signal; an addition unit that smoothes the detection signal generated in the FM detection unit and adds an offset to the detection signal; an Auto Frequency Controller (AFC) unit that generates a first control signal for controlling a frequency of the local oscillation signal based on the smoothed detection signal to which the offset is added; a selection unit that selects one of the first control signal from the AFC unit and the modulation signal from the modulation frequency generation unit as a second control signal and outputs the selected second control signal to the local oscillator; and a control unit that generates a selection signal indicating a signal that should be selected in the selection unit, based on the detection signal generated in the FM detection unit.

Another embodiment relates to an FM reception method. The method comprises: outputting a modulation signal of a predetermined frequency; subjecting an FM signal to quadrature detection by using a local oscillation signal and outputting a base band signal; reducing a direct current component contained in the base band signal; restoring the direct current component by correcting the base band signal such that the base band signal is centered around an origin of a polar coordinate system on an IQ plane; subjecting the corrected base band signal to FM detection and generating a detection signal; adding an offset to the generated detection signal; generating a control signal for controlling a frequency of the local oscillation signal based on the detection signal to which the offset is added; and selecting one of the control signal and the modulation signal according to a selection signal generated based on the detection signal and outputting the selected signal to the local oscillator.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

Embodiment 1

A summary will be given before describing the invention in specific details. Embodiment 1 relates to a direct conversion FM reception device mainly comprised of a quadrature detector and an FM detector. Provision of a coupling capacitor between the quadrature detector and the FM detector eliminates the need to correct the displacement between the origin of the rectangular coordinate system in the quadrature detector and that of the FM detector. In the event that an unmodulated signal is received and AFC converges the frequency displacement between the received signal and the local oscillation signal to zero, however, the output from the quadrature detector is locked to a single point on a circle in the coordinate system on the IQ plane. The level of the signal input to the FM detector is reduced by the coupling capacitor to approach the origin. Arctan detection in the FM detector outputs the magnitude of phase rotation. Therefore, if the input is locked to the neighborhood of the origin, phase rotation caused by irregular noise will be detected. Consequently, FM detection results in noise. Meanwhile, FM detection should result in silence if the received signal is unmodulated. This is addressed by targeting a certain offset value instead of zero in AFC to converge the frequency displacement, so as to prevent the rotation of the quadrature detection output in the coordinate system on the IQ plane from being terminated, i.e., to cause the frequency of the received signal and the frequency of the local oscillation signal to maintain a certain level.

If the received signal is modulated and a DC component is contained in the base band signal subjected to quadrature detection, however, the DC component is suppressed so that the FM detection signal is distorted. This is addressed by the FM reception device according to this embodiment by turning the base band signal into an amplitude signal and a phase signal by rectangular to polar conversion and detecting the displacement of the base band signal from the origin. Further, the base band signal is corrected by using the displacement as a correction value. A constellation is defined as a circle. Therefore, the above process corrects the center of the circle to be located at the origin of the IQ plane. This enables the DC component in the base band spectrum to be restored equivalently and suppresses the distortion in the FM detection.

Figure 1:
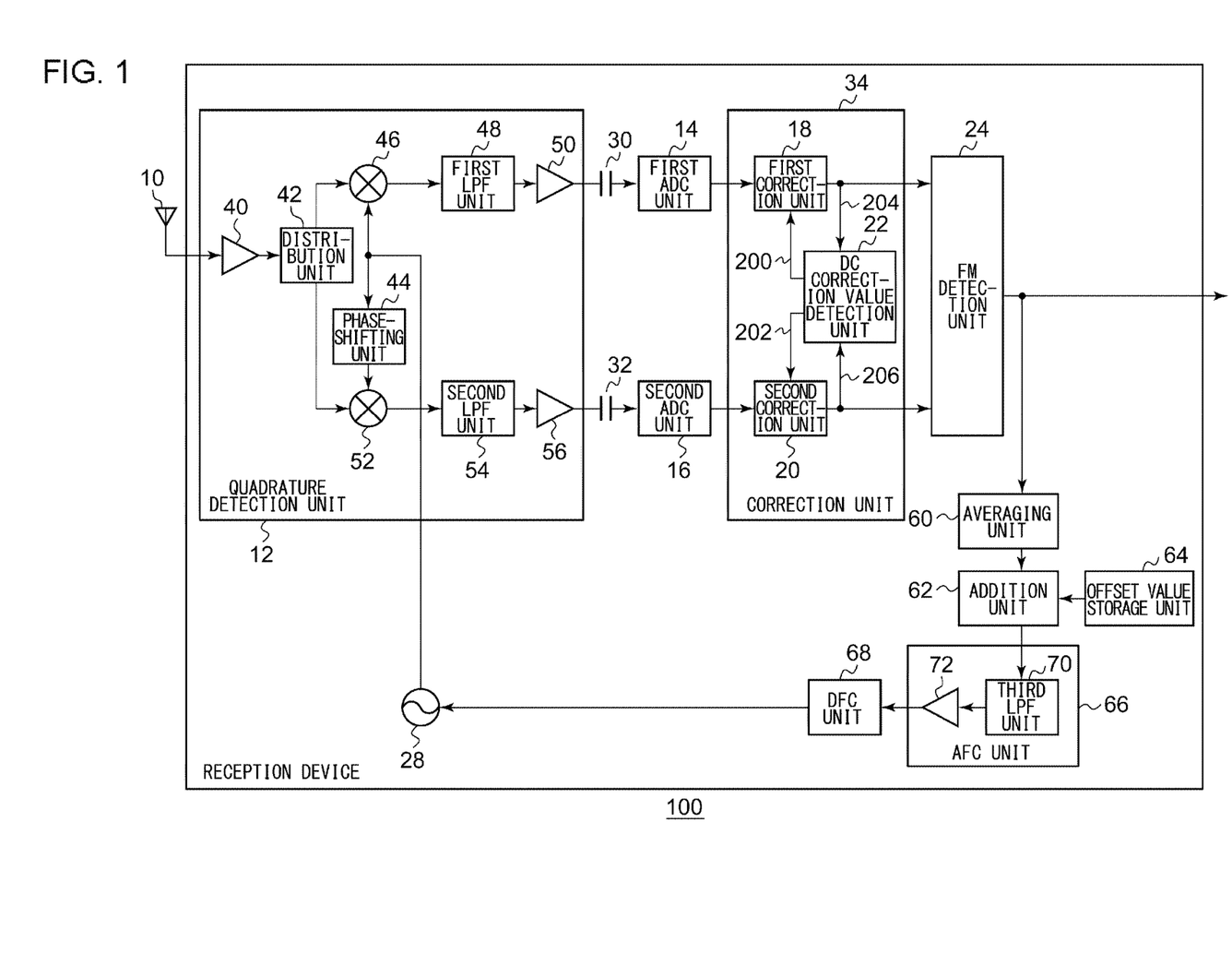
FIG. 1 shows features of a reception device according to Embodiment 1.

FIG. 1 shows features of a reception device 100 according to Embodiment 1. The reception device 100 includes an antenna 10, a quadrature detection unit 12, a first reduction unit 30, a second reduction unit 32, a first ADC unit 14, a second ADC unit 16, a correction unit 34, an FM detection unit 24, an averaging unit 60, an addition unit 62, an offset storage unit 64, an AFC unit 66, a DAC unit 68, and a local oscillator 28. The quadrature detection unit 12 includes a first amplifier unit 40, a distribution unit 42, a phase shifting unit 44, a first mixer 46, a first LPF unit 48, a second amplifier unit 50, a second mixer 52, a second LPF unit 54, and a third amplifier unit 56. The correction unit 34 includes a first correction unit 18, a second correction unit 20, and a DC correction value detection unit 22. The AFC unit 66 includes a third LPF unit 70 and a fourth amplifier unit 72.

The antenna 10 receives a Radio Frequency (RF) signal from a transmission device (not shown). The antenna 10 outputs the received RF signal (hereinafter, also referred to as "received signal") to the first amplifier unit 40. The first amplifier unit 40 is a Low Noise Amplifier (LNA) and amplifiers the RF signal from the antenna 10. The first amplifier unit 40 outputs the amplified RF signal to the distribution unit 42. The distribution unit 42 splits the RF signal from the first amplifier unit 40 into signals of two systems. The distribution unit 42 outputs the split RF signals to the first mixer 46 and the second mixer 52.

The local oscillator 28 regulates the frequency of the local oscillation signal in accordance with a control signal from the DAC unit 68 and outputs the local oscillation signal with the regulated frequency to the phase shifting unit 44 and the first mixer 46. The local oscillator 28 regulates the frequency of the local oscillation signal such that the higher the voltage of the control signal, the higher the frequency. The phase shifting unit 44 shifts the phase of the local oscillation signal from the local oscillator 28 by 90 degrees. The phase shifting unit 44 outputs the local oscillation signal with the shifted phase to the second mixer 52.

The first mixer 46 generates the I-phase base band signal (hereinafter, "I signal") by multiplying the RF signal from the distribution unit 42 by the local oscillation signal from the local oscillator 28. The first mixer 46 outputs the I signal to the first LPF unit 48. The second mixer 52 generates the Q-phase base band signal (hereinafter, "Q signal") by multiplying the RF signal from the distribution unit 42 by the local oscillation signal from the phase shifting unit 44. The second mixer 52 outputs the Q signal to the second LPF unit 54.

Of the I signals from the first mixer 46, the first LPF unit 48 eliminates signals of a frequency equal to or higher than a cut-off frequency, thereby limiting the band. The first LPF unit 48 outputs the I signal comprised of low-frequency components (hereinafter, also referred to as "I signal") to the second amplifier unit 50. Of the Q signals from the second mixer 52, the second LPF unit 54 eliminates signals of a frequency equal to or higher than a cut-off frequency, thereby limiting the band. The second LPF unit 54 outputs the Q signal comprised of low-frequency components (hereinafter, also referred to as "Q signal") to the third amplifier unit 56.

The second amplifier unit 50 amplifiers the I signal from the first LPF unit 48 and the third amplifier unit 56 amplifiers the Q signal from the second LPF unit 54. As described above, the quadrature detection unit 12 subjects the RF signal to quadrature detection. The quadrature detection unit 12 is comprised of an analog device. For example, the quadrature detection unit 12 is comprised of one chip. Due to the nature of an analog device, the I signal output from the second amplifier unit 50 and the Q signal output from the third amplifier unit 56 may contain unnecessary direct current components. As a result, a DC offset voltage is added to these signals.

The first reduction unit 30 receives the I signal from the second amplifier unit 50. For example, the first reduction unit 30 is comprised of a coupling capacitor and reduces the direct current component contained in the I signal. The first reduction unit 30 outputs the I signal with the reduced direct current component (hereinafter, also referred to as "I signal") to the first ADC unit 14. The second reduction unit 32 receives the Q signal from the third amplifier unit 56. Like the first reduction unit 30, the second reduction unit 32 is also comprised of a coupling capacitor and reduces the direct current component contained in the Q signal. The second reduction unit 32 outputs the Q signal with the reduced direct current component (hereinafter, also referred to as "Q signal") to the second ADC unit 16. The first reduction unit 30 and the second reduction unit 32 prevent the DC offset voltage of the base band signal output from the quadrature detection unit 12 from affecting the subsequent steps.

The first ADC unit 14 subjects the I signal from the first reduction unit 30 to analog-to-digital conversion. The first ADC unit 14 outputs the digitized I signal (hereinafter, also referred to as "I signal") to the first correction unit 18. The second ADC unit 16 subjects the Q signal from the second reduction unit 32 to analog-to-digital conversion. The second ADC unit 16 outputs the digitized Q signal (hereinafter, also referred to as "Q signal") to the second correction unit 20.

As described above, the first correction unit 18, the second correction unit 20, and the DC correction value detection unit 22 constitute the correction unit 34. The DC correction value detection unit 22 detects the displacement of the constellation from the origin on the IP plane. The first correction unit 18 and the second correction unit 20 correct the displacement of the constellation from the origin on the IQ plane.

The first correction unit 18 receives the I signal output from the first ADC unit 14 and also receives the I-phase correction value 200 from the DC correction value detection unit 22. The first correction unit 18 corrects the I signal by the I-phase correction value 200 by adding the I signal and the I-phase correction value 200. The first correction unit 18 outputs a corrected I signal as the I signal 204 to the DC correction value detection unit 22 and the FM detection unit 24.

The second correction unit 20 receives the Q signal output from the second ADC unit 16 and also receives the Q-phase correction value 202 from the DC correction value detection unit 22. The second correction unit 20 corrects the Q signal by the Q-phase correction value 202 by adding the Q signal and the Q-phase correction value 202. The second correction unit 20 outputs a corrected Q signal as the Q signal 206 to the DC correction value detection unit 22 and the FM detection unit 24.

The DC correction value detection unit 22 receives the I signal 204 from the first correction unit 18 and the Q signal 206 from the second correction unit 20 and generates the I-phase correction value 200 and the Q-phase correction value 202 based on the received signals. The I-phase correction value 200 and the Q-phase correction value 202 will be described later in details. The DC correction value detection unit 22 outputs the I-phase correction value 200 to the first correction unit 18 and outputs the Q-phase correction value 202 to the second correction unit 20. The features of the DC correction value detection unit 22 will be described by using FIG. 2.

Figure 2:
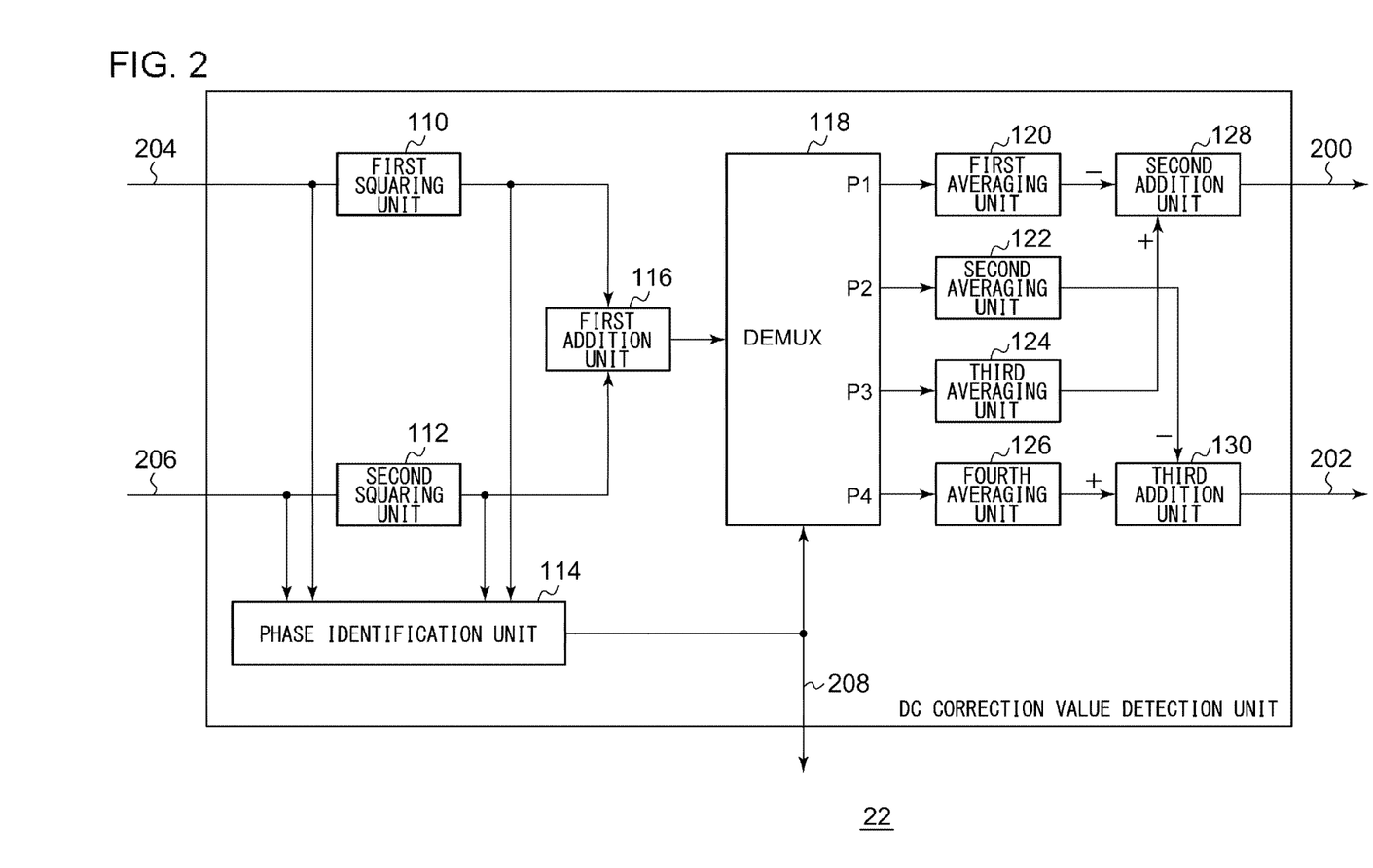
FIG. 2 shows features of the DC correction value detection unit of FIG. 1.

FIG. 2 shows features of the DC correction value detection unit 22. The DC correction value detection unit 22 includes a first squaring unit 110, a second squaring unit 112, a phase identification unit 114, a first addition unit 116, a DEMUX 118, a first averaging unit 120, a second averaging unit 122, a third averaging unit 124, a fourth averaging unit 126, a second addition unit 128, and a third addition unit 130.

The first squaring unit 110 receives the I signal 204 and derives a square value of the received signal. The first squaring unit 110 outputs the square value of the I signal 204 to the phase identification unit 114 and the first addition unit 116. The second squaring unit 112 receives the Q signal 206 and derives a square value of the received signal. The second squaring unit 112 outputs the square value of the Q signal 206 to the phase identification unit 114 and the first addition unit 116.

The first addition unit 116 receives the square value of the I signal 204 from the first squaring unit 110 and receives the square value of the Q signal 206 from the second squaring unit 112. The first addition unit 116 adds the square value of the I signal 204 and the square value of the Q signal 206. The result of addition represents a power value P of the I signal 204 and the Q signal 206. The power value P is a square value of the amplitude signal resulting from subjecting the I signal 204 and the Q signal 206 to rectangular to polar conversion. For this reason, the process performed by the first squaring unit 110, the second squaring unit 112, and the first addition unit 116 represents a process of deriving an amplitude signal. The first addition unit 116 outputs the power value P to the DEMUX 118.

Figure 3:
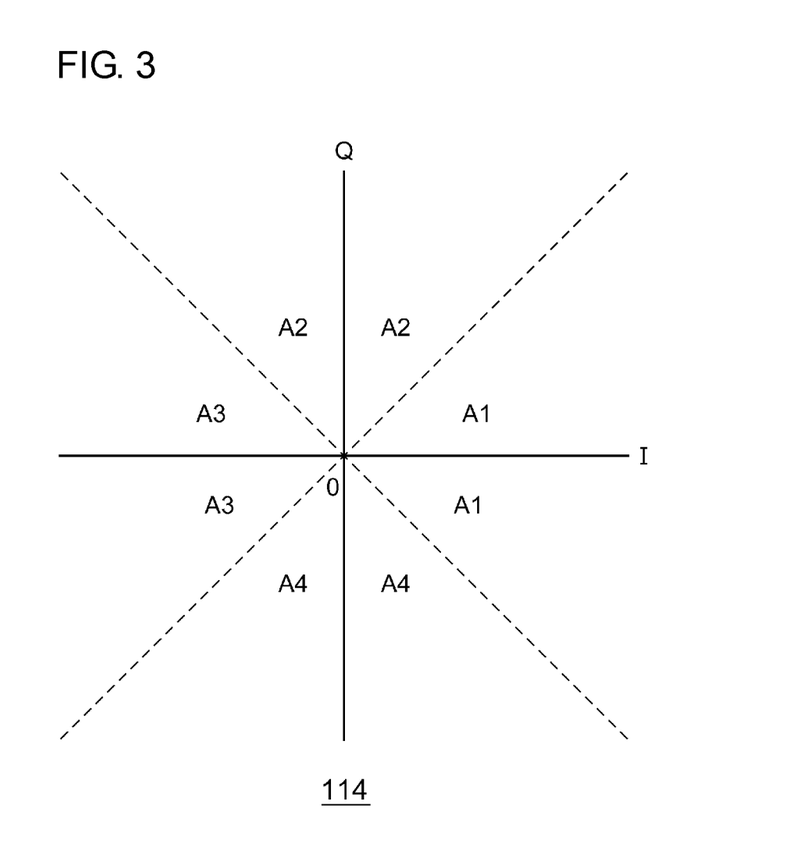
FIG. 3 shows a plurality of domains defined in the phase identification unit of FIG. 2.

The phase identification unit 114 receives the I signal 204 and the Q signal 206, receives the square value of the I signal 204 from the first squaring unit 110, and receives the square value of the Q signal 206 from the second squaring unit 112. The phase identification unit 114 identifies the phase domain based on these values. FIG. 3 will be used to explain the process. FIG. 3 shows a plurality of domains defined in the phase identification unit 114. The figure shows an IQ plane. The horizontal axis represents the I axis and the vertical axis represents the Q axis. As shown in the figure, four phase domains from A1 to A4 are defined so as not to overlap each other. The phase domain A1 is a range of $\pi/2$ from $7\pi/4$ to $\pi/4$, the phase domain A2 is a range of $\pi/2$ from $\pi/4$ to $3\pi/4$, the phase domain A3 is a range of $\pi/2$ from $3\pi/4$ to $5\pi/4$, and the phase domain A4 is a range of $\pi/2$ from $5\pi/4$ to $7\pi/4$.

For clarity of the notation, the I signal 204 will be denoted by "I," the Q signal 206 will be denoted by "Q," the square value of the I signal 204 will be denoted by "I2," and the square value of the Q signal will be denoted by "Q2" in the following description. The phase identification unit 114 groups the signals in the four phase domains A1, A2, A3, and A4 in accordance with the following conditions for identification.

A1: $I^2 \geq Q^2$, $I \geq 0$
A2: $I^2 < Q^2$, $Q \geq 0$
A3: $I^2 \geq Q^2$, $I < 0$
A4: $I^2 < Q^2$, $Q < 0$ The phase identification unit 114 outputs the identified phase domain as a phase domain signal 208. If the identified phase domain varies in succession such that A1, A2, A3, A3, A4, A1, A2, . . . with time, for example, the phase domain signal 208 also varies in succession such that A1, A2, A3, A4, A1, A2, . . . . The process performed by the phase identification unit 114 represents a process of deriving a phase signal resulting from subjecting the I signal 204 and the Q signal 206 to rectangular to polar conversion. Reference is made back to FIG. 2.

The DEMUX 118 receives the power value P from the first addition unit 116 and the phase domain signal 208 from the phase identification unit 114 in succession. The power value P and the phase domain signal 208 are synchronized. The DEMUX 118 outputs the power value P as one of power values P1 through P4 in accordance with the phase domain indicated in the phase domain signal 208. To describe it more specifically, the DEMUX 118 outputs the power value P1 if the phase domain A1 is indicated, outputs the power value P2 if the phase domain A2 is indicated, outputs the power value P3 if the phase domain A3 is indicated, and outputs the power value P4 if the phase domain A4 is indicated. In essence, the DEMUX 118 is a demultiplexer that demultiplexes the power value P into power values P1 through P4 in accordance with the phase domain indicated in the phase domain signal 208.

The first averaging unit 120 calculates an average power P1 of the input power value P1 over a predetermined period of time and outputs the average power P1 to the second addition unit 128. For example, a moving average may be used. The second averaging unit 122 calculates an average power P2 of the input power value P2 over a predetermined period of time and outputs the average power P2 to the third addition unit 130. The third averaging unit 124 calculates an average power P3 of the input power value P3 over a predetermined period of time and outputs the average power P3 to the second addition unit 128. The fourth averaging unit 126 calculates an average power P4 of the input power value P4 over a predetermined period of time and outputs the average power P4 to the third addition unit 130. The process in the first averaging unit 120 through the fourth averaging unit 126 represents deriving an average of amplitude signals for the respective phase domains.

The second addition unit 128 receives the average power P1 from the first averaging unit 120 and receives the average power P3 from the third averaging unit 124. The second addition unit 128 subtracts the average power P1 from the average power P3. The second addition unit 128 outputs the result of subtraction as the I-phase correction value 200. The third addition unit 130 receives the average power P2 from the second averaging unit 122 and receives the average power P4 from the fourth averaging unit 126. The third addition unit 130 subtracts the average power P2 from the average power P4. The third addition unit 130 outputs the result of subtraction as the Q-phase correction value 202. Thus, the DC correction value detection unit 22 determines the displacement of the I signal 204 and the Q signal 206 from the origin by referring to the average of the power values (i.e., the values corresponding to the amplitude signals) in the respective phase domains. The DC correction value detection unit 22 outputs the displacement as the I-phase correction value 200 and the Q-phase correction value 202. This corresponds to deriving the I-phase correction value 200 and the Q-phase correction value 202 such that the amplitudes in the plurality of phase domains defined on the IQ plane approximate each other, i.e., deriving the correction values that correct the position of the I, Q pattern of the base band signal on the IQ plane such that the pattern is represented by a circle centered around the origin of the polar coordinate system.

The inputs to the DC correction value detection unit 22 are described as being the outputs from the first correction unit 18 and the second correction unit 20. Alternatively, the inputs may be extracted at the input end of the first correction unit 18 and the second correction unit 20 and corrected in the first correction unit 18 and the second correction unit 20 and the I signal 204 and the Q signal 206 may be output accordingly.

The correction unit 34 is a means for correcting the origin in the polar coordinate system on the IQ plane but may not be configured as described above. For example, displacement of the constellation from the origin results in an amplitude component so that the correction unit 34 may derive correction values from the I-axis and Q-axis components of the vectors of maximum and minimum values from the origin to a point on the constellation and may correct the base band signal accordingly. Reference is made back to FIG. 1.

An FM detection unit subjects the corrected base band signal to FM detection. For example, Arctan detection is performed as FM detection. In Arctan detection, an angle formed by two sides of a triangle representing the I signal 204 and the Q signal 206 is derived. Angular variation per unit time represents an angular velocity, i.e., frequency. Therefore, demodulation from FM modulation is enabled. The FM detection unit 24 outputs a detection signal resulting from FM detection. For example, the output detection signal represents a sound signal. It should of course be noted that the device according to the Embodiment is compatible with all modulation schemes that can be subject to detection by the FM detector.

The averaging unit 60 receives the detection signal from the FM detection unit 24. The averaging unit 60 averages the detection signal over a predetermined period of time and outputs an average voltage to the addition unit 62. For example, a moving average is used. The average voltage voltage is proportional to a frequency difference between the central frequency of the received signal the output frequency of the local oscillation signal. Therefore, if the average voltage is "0," it means that the frequencies are identical. As described above, in the event that an unmodulated signal is received and AFC converges the frequency displacement between the received signal and the local oscillation signal to zero, the I signal and the Q signal are locked at a single point on a circle in the coordinate system so that the level of the signal input to the FM detector is reduced to approach the origin. In order to address this situation, the following process is performed.

The offset storage unit 64 stores a predefined offset value. The addition unit 62 receives the offset value from the offset storage unit 64 and receives the average voltage from the averaging unit 60. The addition unit 62 adds the offset value to the average voltage and outputs the result to the third LPF unit 70. Absent the addition of the offset value in the addition unit 62, the AFC unit 66 controls the central frequency of the received signal and the frequency of the local oscillation signal to be identical. Because the addition unit 62 adds a certain offset value, the local oscillation signal has a frequency offset commensurate with the offset value. If the frequency offset is set at a frequency not reduced by the first reduction unit 30 and the second reduction unit 32, the I signal and the Q signal will be prevented from being turned into a direct current component and will have a frequency identical to the frequency offset. Therefore, the detection signal will not be turned into a noise even when an unmodulated Rf signal is input.

The third LPF unit 70 receives an average voltage to which an offset value is added (hereinafter, also referred to as "average voltage") from the addition unit 62. The third LPF unit 70 performs low pass filtering on the average voltage. The third LPF unit 70 outputs the average voltage subjected to the low pass filtering (hereinafter, also referred to as "average voltage") to the fourth amplifier unit 72. The fourth amplifier unit 72 generates a control signal by amplifying the average voltage from the third LPF unit 70. Amplification in the fourth amplifier unit 72 determines the gain of an AFC loop.

The DAC unit 68 subjects the control signal from the fourth amplifier unit 72 to digital to analog conversion and outputs the analog control signal (hereinafter, also referred to as "control signal") to the local oscillator 28. Thus, the AFC unit 66 generates a control signal for controlling the frequency of the local oscillation signal by referring to the average voltage to which the offset is added by the addition unit 62, and feeds back the control signal to the local oscillator 28. Addition of the offset represents controlling the frequency of the local oscillation signal output from the local oscillator 28 so that the phase component resulting from rectangular to polar conversion in the DC correction value detection unit 22 is rotated.

AFC control need not be as described above. If the frequency of the local oscillator 28 is set by a fractional PLL, AFC control is possible by configuring a frequency division ratio. In this case, conversion into an analog voltage by the DAC unit 68 is not necessary.

As discussed above, even if there is an offset between the frequency of the received signal and the frequency of the local oscillation signal, the DC component in the base band signal output from the quadrature detection unit 12 is suppressed by the first reduction unit 30 and the second reduction unit 32 with the result that the detection signal is distorted.

Figure 4:
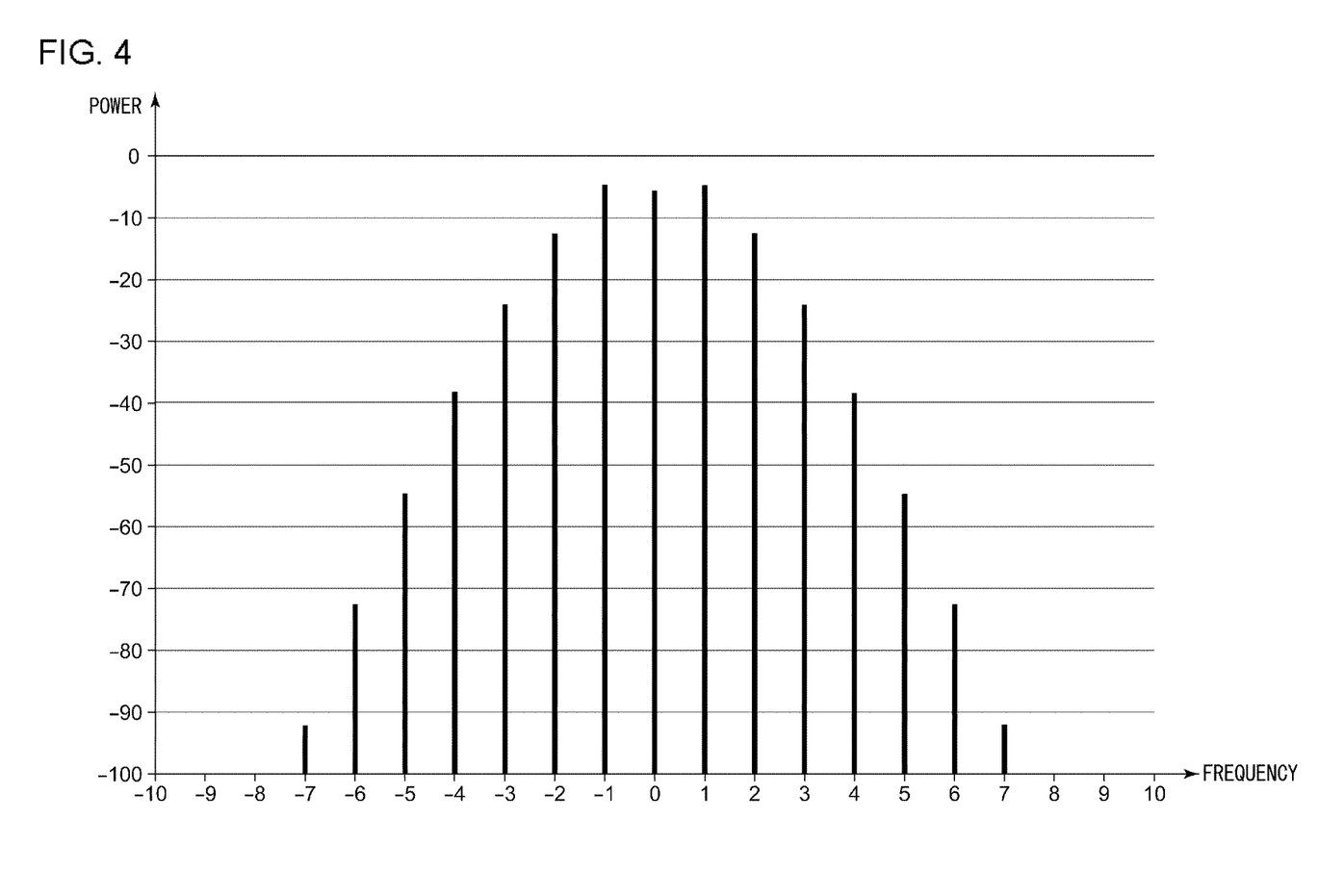
FIG. 4 shows a transmission spectrum of a transmission signal for the reception device of FIG. 1.

FIG. 4 shows a transmission spectrum derived from conversion into the base band of the transmission signal for the reception device 100. The horizontal axis represents frequency and the vertical axis represents power. The graph shows a transmission spectrum of a signal subjected to FM modulation with a modulation signal of 1 kHz and a deviation of 1.5 kHz. The graph shows a line spectrum of an interval of 1 kHz horizontally symmetrical around the center frequency.

Figure 5:
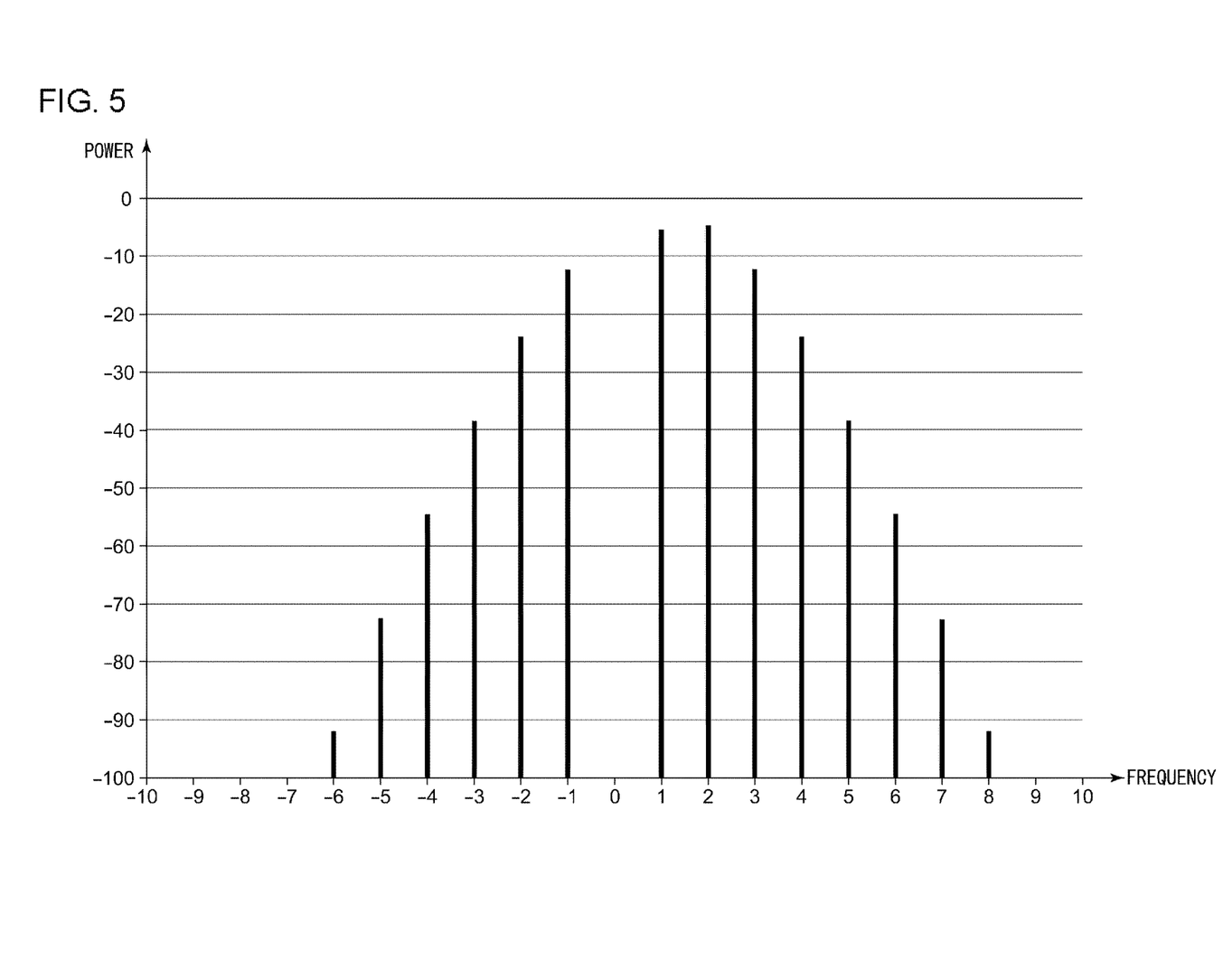
FIG. 5 shows a quadrature detection spectrum of the base band signal output from the first reduction unit and the second reduction unit of FIG. 1.
Figure 6:
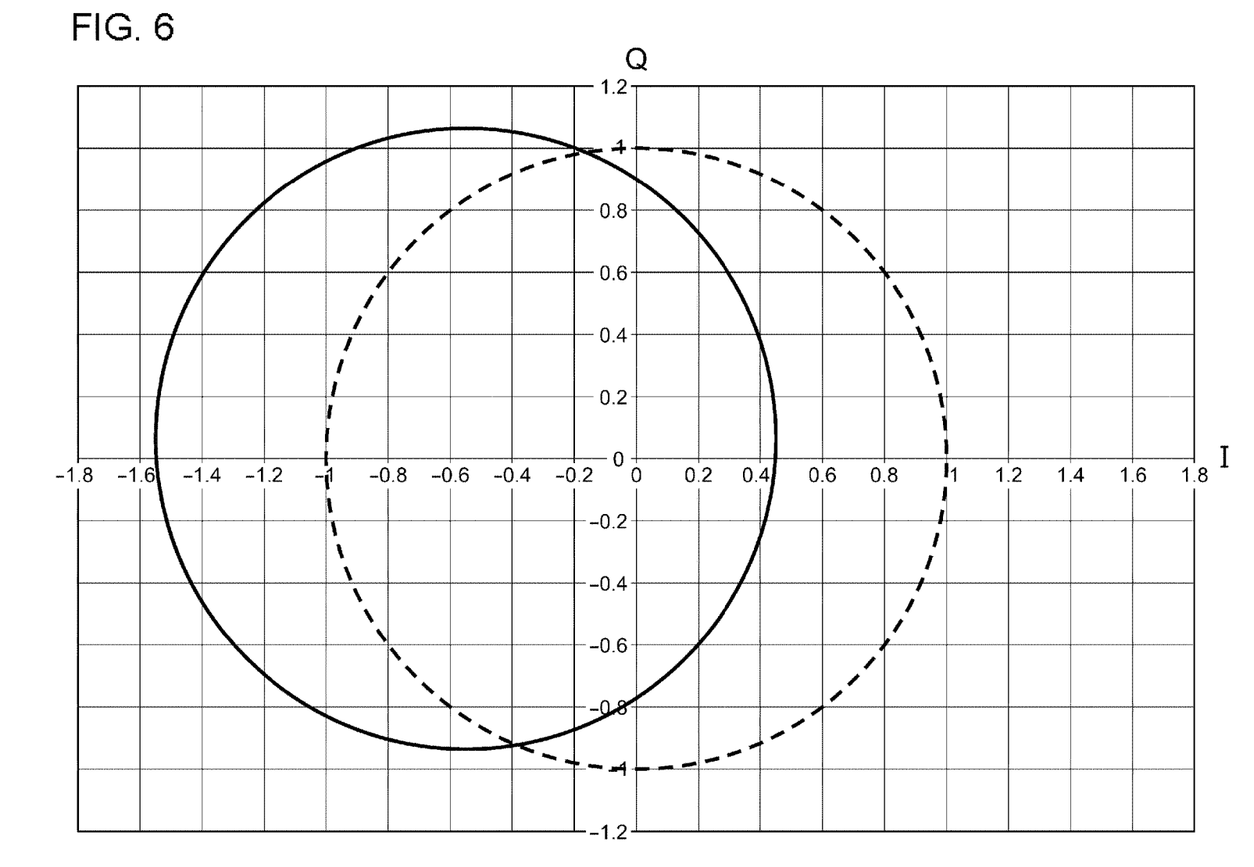
FIG. 6 shows the I, Q patterns of the transmission signal and the base band signal FIGS. 4 and 5.

It will be assumed here that the offset value output from the offset storage unit 64 corresponds to the offset frequency of 1 kHz. In this case, the base band signal output from the first reduction unit 30 and the second reduction unit 32 is as shown in FIG. 5. FIG. 5 shows a quadrature detection spectrum of the base band signal output from the first reduction unit 30 and the second reduction unit 32. The horizontal axis represents frequency and the vertical axis represents power. As shown in the graph, a frequency offset of 1 kHz is provided so that the DC signal component resulting from frequency conversion is suppressed. This is represented on the IQ plane as shown in FIG. 6. FIG. 6 shows the I, Q patterns of the transmission signal and the base band signal. The horizontal axis represents I axis and the vertical axis represents Q axis. The I, Q pattern of the transmission signal subject to comparison is indicated by a dotted line and is represented by a circle centered around the origin. Meanwhile, the DC component of the base band signal is suppressed so that the I, Q pattern of the base band signal is represented by a circle centered at a point displaced from the origin as indicated by the solid line.

Figure 7:
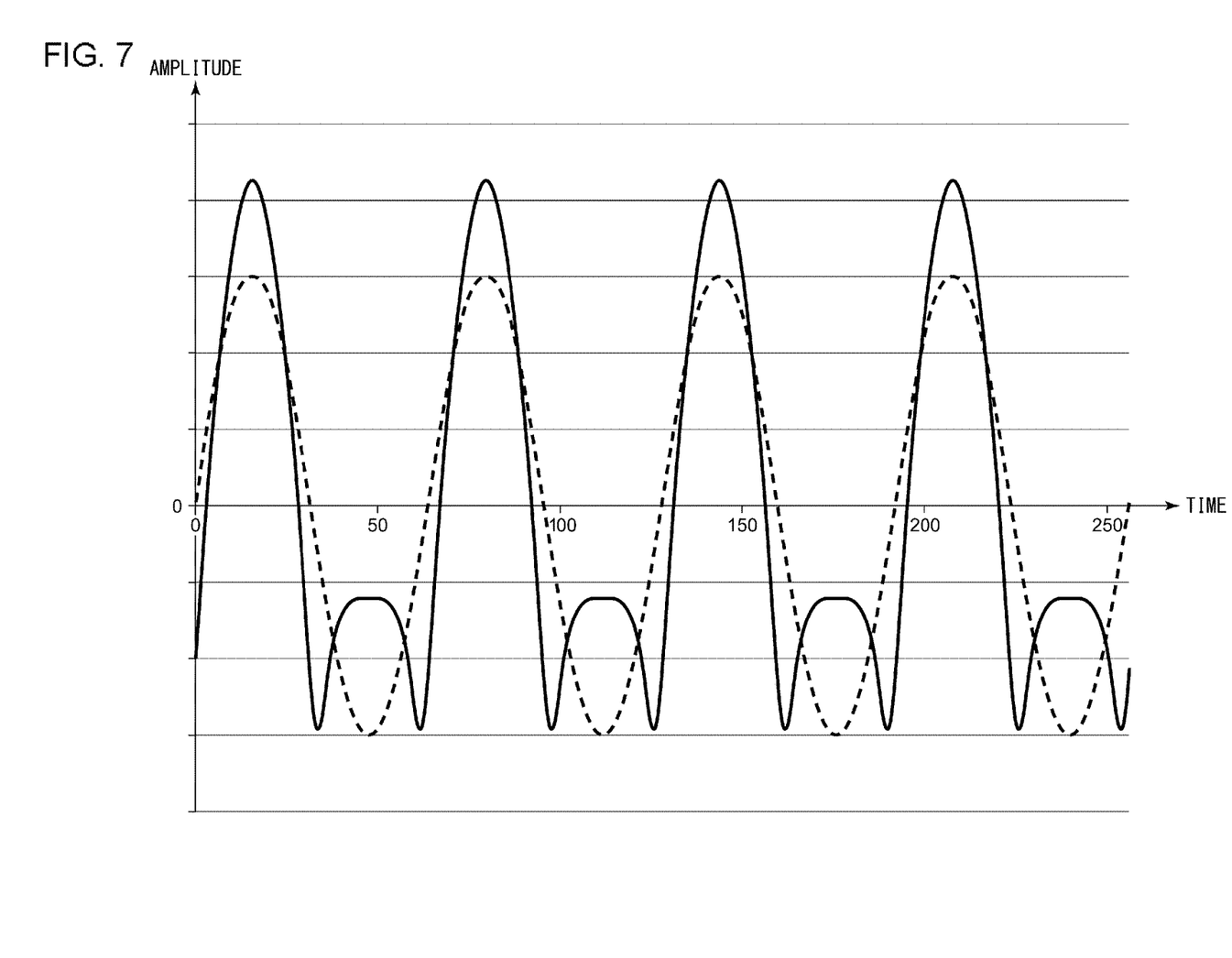
FIG. 7 shows waveforms of the transmission signal and the detection signal of FIGS. 4, and 5.

The detection signal resulting from subjecting the base band signal to detection in the FM detection unit 24 is shown in FIG. 7. FIG. 7 shows a modulation waveform of the transmission signal and a demodulation waveform of the detection signal. The horizontal axis represents time and the vertical axis represents amplitude. The modulation waveform of the transmission signal subject to comparison is indicated by a dotted line and is a sine waveform. Meanwhile, the detection signal is indicated by a solid line. A distortion component is generated due to the suppression of the DC component.

The DC correction value detection unit 22 derives correction values that correct the position of the I, Q pattern of the base band signal on the IQ plane such that the pattern is represented by a circle centered around the origin of the polar coordinate system. The DC correction value detection unit 22 generates the I-phase correction value 200 and the Q-phase correction value for correcting the I, Q pattern of the base band signal in FIG. 6 such that the circle representing the pattern is centered around the origin. Since the first correction unit 18 makes correction using the I-phase correction value 200 and the second correction unit 20 makes correction using the Q-phase correction value 202, the distortion in the detection signal is suppressed. In essence, the first correction unit 18 and the second correction unit 20 equivalently restore the suppressed DC component of the base band signal.

The features are implemented in hardware such as a CPU, a memory, or other LSI's of an arbitrary computer, and in software such as a program loaded into a memory, etc. The figure depicts functional blocks implemented by the cooperation of these elements. Therefore, it will be obvious to those skilled in the art that the functional blocks may be implemented in a variety of manners by hardware only, by software only, or by a combination of hardware and software.

The first reduction unit 30 and the second reduction unit 32 are described as being comprising a coupling capacitor by way of example. Alternatively, reduction may be achieved by using the first ADC unit 14 and the second ADC unit 16 to digitize the I signal and the Q signal and performing digital high pass filtering on the digitized signal.

In accordance with this embodiment, a certain offset is introduced between the frequency of the received signal and the frequency of the local oscillation signal. This prevents the base band signal from being cut entirely, even if an unmodulated signal is input. Since the base band signal is prevented from being cut entirely, the FM detection output is prevented from comprising only the noise as in the case of absence of RF signals received. Since the FM detection output is prevented from comprising only the noise, the quality of the signal subjected to FM detection is improved. Further, the displacement of the center from the origin on the IP plane due to the I signal and the Q signal with the reduced direct current component is corrected, the dropped DC component in the base band spectrum is restored. Since the dropped DC component is restored, distortion in the detection signal is suppressed.

Embodiment 2

A description will now be given of Embodiment 2. Like Embodiment 1, Embodiment 2 relates to an FM reception device of direct conversion type in which a coupling capacitor is provided between the quadrature detector and the FM detector. In Embodiment 1, an offset value is added to the detection signal before running AFC in order to prevent the frequency of the received signal and the frequency of the local oscillation signal from being identical. Meanwhile, in Embodiment 2, AFC is not used and the control signal that should be input to the local oscillator is subject to FM modulation in order to prevent the frequency of the received signal from being identical to the frequency of the local oscillation signal. This causes the frequency of the local oscillation signal to vary in accordance with FM modulation.

Figure 8:
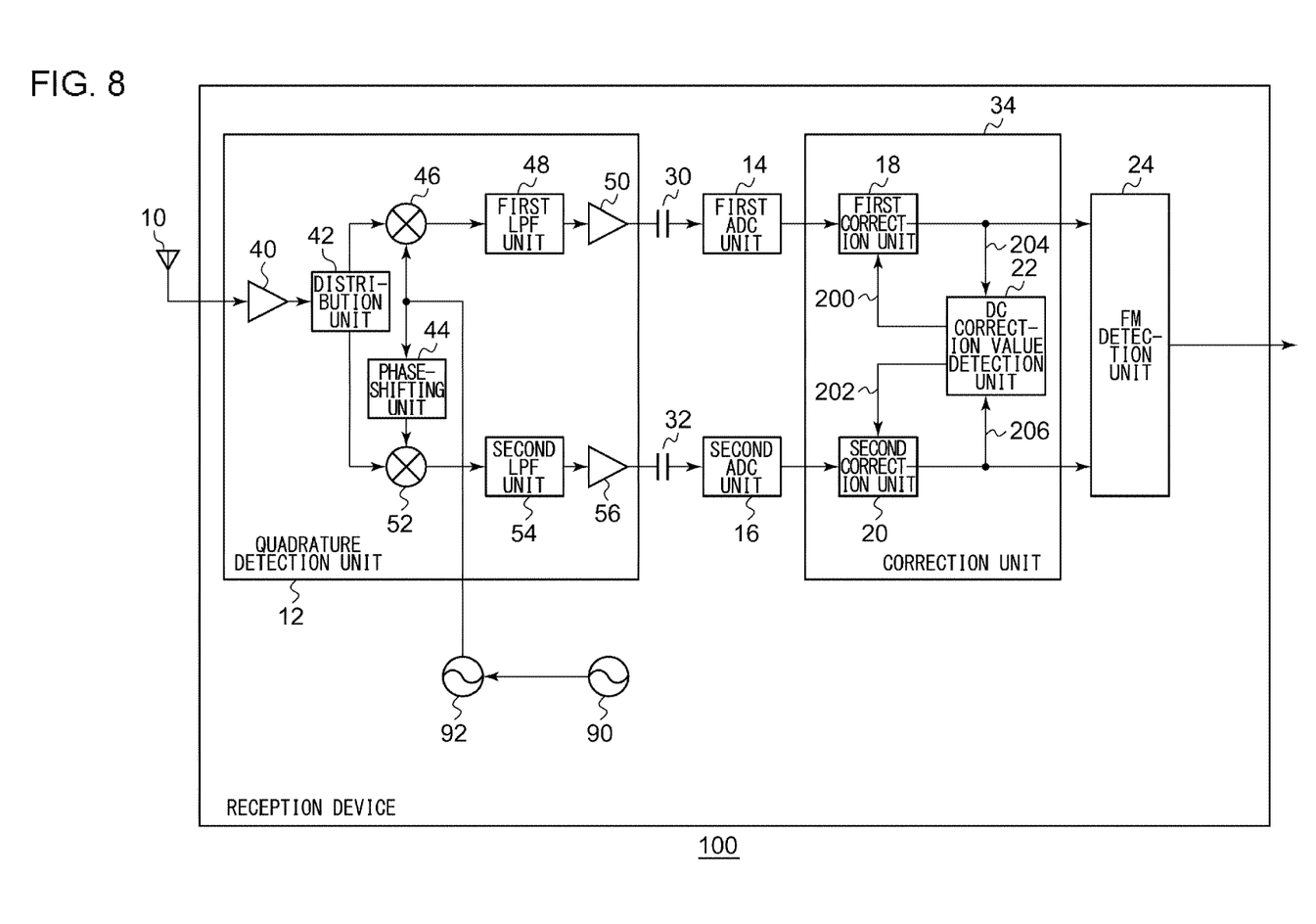
FIG. 8 shows features of the reception device according to Embodiment 2.

FIG. 8 shows features of the reception device 100 according to Embodiment 2. The reception device 100 includes an antenna 10, a quadrature detection unit 12, a first reduction unit 30, a second reduction unit 32, a first ADC unit 14, a second ADC unit 16, a correction unit 34, an FM detection unit 24, a first local oscillator 90, and a second local oscillator 92. The quadrature detection unit 12 includes a first amplifier unit 40, a distribution unit 42, a phase shifting unit 44, a first mixer 46, a first LPF unit 48, a second amplifier unit 50, a second mixer 52, a second LPF unit 54, and a third amplifier unit 56. The correction unit 34 includes a first correction unit 18, a second correction unit 20, and a DC correction value detection unit 22. The following description concerns a difference from the description above.

The first local oscillator 90 outputs a first local oscillation signal to the second local oscillator 92. The second local oscillator 92 regulates the frequency of the second local oscillation signal in accordance with the first local oscillation signal from the first local oscillator 90 and outputs the second local oscillation signal with the regulated frequency to the first mixer 46 and the phase shifting unit 44. This corresponds to outputting the second local oscillation signal frequency-modulated by using the first local oscillation signal from the first local oscillator 90 to the quadrature detection unit 12. The first mixer 46 and the second mixer 52 of the quadrature detection unit 12 subject the FM signal from the distribution unit 42 to quadrature detection by using the second local oscillation signal output from the second local oscillator 92 and outputs the base band signal accordingly. In other words, the second local oscillation signal corresponds to the local oscillation signal in Embodiment 1.

Thus, the base band signal is generated by subjecting the RF signal to quadrature detection by using the second local oscillation signal subjected to FM modulation by using the first local oscillation signal. Therefore, even if the received signal is unmodulated and the frequency thereof is identical to that of the second local oscillation signal, the base band signal will not be locked to a constant value so that the base band signal is prevented from being completely suppressed. As in Embodiment 1, any DC component contained in the base band signal is corrected by the correction unit 34. Further, the detection signal output from the FM detection unit includes a combination of the modulated component of the received signal and the frequency component of the first local oscillation signal, but the components can be isolated by configuring the oscillation frequency of the first local oscillation signal to be lower than the lowermost frequency of the modulated component, i.e., lower than the demodulation band.

According to the embodiment, the second local oscillation frequency is frequency-modulated so that the base signal is prevented from being reduced continuously by the reduction unit. Further, since the frequency of the first local oscillation signal from the first local oscillator is configured to be lower than the demodulation band, the base band signal is prevented from being reduced continuously by the reduction unit regardless of whether the signal is modulated or not.

The first local oscillator 90 is a modulation frequency generator for generating a predetermined modulation frequency. The second local oscillator 92 outputs the second local oscillation signal modulated by the predetermined modulation frequency. In essence, what is required is to output the frequency-modulated second local oscillation signal to the quadrature detection unit 12. Therefore, the modulation frequency need not be generated by the oscillator. For example, if the frequency of the second local oscillator 92 is controlled by a fractional PLL, the second oscillation signal may be FM-modulated with the predetermined modulation frequency by setting a frequency division ratio. The component that sets the frequency division ratio (e.g., a CPU) may be defined as a modulation frequency generator.

Embodiment 3

A description will now be given of Embodiment 3. Like Embodiment 1, Embodiment 3 relates to an FM reception device of direct conversion type in which a coupling capacitor is provided between the quadrature detector and the FM detector. In Embodiment 1, an offset value is added to the detection signal before running AFC in order to prevent the frequency of the received signal and the frequency of the local oscillation signal from being identical. In Embodiment 2, this is achieved by subjecting the control signal that should be input to the local oscillator to FM modulation. AFC can operate only after the received signal is subjected to FM detection. Meanwhile, unlike AFC control, FM modulation of the local oscillation signal is possible even before the received signal is subjected to FM detection but degrades C/N of the local oscillation signal. This tends to result in degradation in reception properties such as reciprocal mixing and poorer S/N. Embodiment 3 combines AFC control and FM modulation. The process is switched depending on whether the system is in a signal detection stage or in a subsequent stage. Before a signal is detected, the local oscillation signal is subject to FM modulation. After a signal is detected, AFC is performed.

Figure 9:
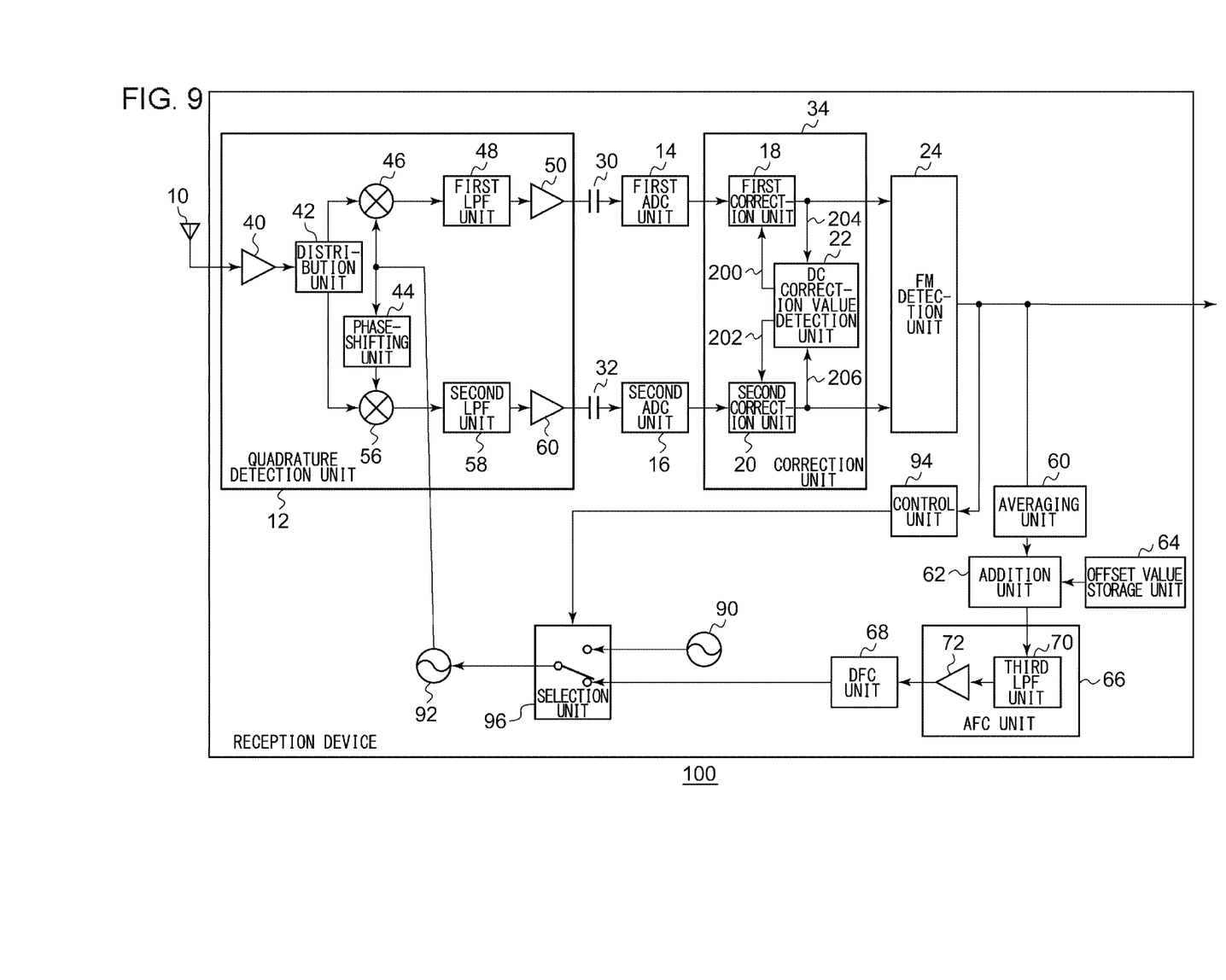
FIG. 9 shows features of the reception device according to Embodiment 3.

FIG. 9 shows features of the reception device 100 according to Embodiment 3. The reception device 100 includes an antenna 10, a quadrature detection unit 12, a first reduction unit 30, a second reduction unit 32, a first ADC unit 14, a second ADC unit 16, a correction unit 34, an FM detection unit 24, an averaging unit 60, an addition unit 62, an offset storage unit 64, an AFC unit 66, a DAC unit 68, and a first local oscillator 90, a second local oscillator 92, a control unit 94, and a selection unit 96. The quadrature detection unit 12 includes a first amplifier unit 40, a distribution unit 42, a phase shifting unit 44, a first mixer 46, a first LPF unit 48, a second amplifier unit 50, a second mixer 52, a second LPF unit 54, and a third amplifier unit 56. The correction unit 34 includes a first correction unit 18, a second correction unit 20, and a DC correction value detection unit 22. The AFC unit 66 includes a third LPF unit 70 and a fourth amplifier unit 72. The following description concerns a difference from the description above.

The selection unit 96 receives a first control signal from the DAC unit 68 and a first local oscillation signal from the first local oscillator 90. The first control signal corresponds to the control signal in Embodiment 1. The selection unit 96 also receives a selection signal from the control unit 94. The selection unit 96 selects one of the first control signal and the first local oscillation signal as a second control signal, in accordance with the selection signal. The selection unit 96 outputs the selected second control signal to the second local oscillator 92. The second local oscillator 92 regulates the frequency of the second local oscillation signal in accordance with the second control signal from the selection unit 96 and outputs the second local oscillation signal with the regulated frequency to the first mixer 46 and the phase shifting unit 44.

The control unit 94 receives the detection signal from the FM detection unit 24. The control unit 94 generates the selection signal based on the detection signal. The selection signal indicates a signal that should be selected in the control unit 94, i.e., the first control signal or the first local oscillation signal. The control unit 94 represents monitoring whether an RF signal is received in the antenna 10, i.e., monitoring whether a carrier is received. For example, a noise squelch circuit is used. The noise squelch circuit detects noise components in a selected band not lower than the demodulation band for the detection signal output from the FM detection unit 24. If the noise is below a predetermined level, the noise squelch circuit determines that the noise is suppressed by a carrier and the RF signal is received. If the noise is at the predetermined level of higher, the noise squelch circuit determines that the noise is not suppressed and the RF signal is not received.

The control unit 94 generates a selection signal for causing the first local oscillation signal to be selected if the RF signal is not received and outputs the selection signal to the selection unit 96. The selection unit 96 selects the first local oscillation signal based on the selection signal and feeds the second control signal associated with the selection to the second local oscillator 92. As a result, the second local oscillator 92 outputs the second local oscillation signal subjected to FM modulation. Even if an unmodulated signal having the same frequency as that of the second local oscillation signal is received in this state, the I signal and the Q signal are prevented from being locked to a constant value so that the base band signal is prevented from being completely suppressed.

When an RF signal is received in this situation, the control unit 94 detects the RF signal. The oscillation frequency of the first local oscillation signal is superimposed on the detection signal output from the FM detection unit 24. If the oscillation signal of the first local oscillation signal is configured to be within the demodulation band, the first local oscillation signal is output as a detection signal and so is subjected to demodulation.

Therefore, when the reception of an RF signal is detected, the control unit 94 generates a selection signal for causing the first control signal to be selected and outputs the selection signal to the selection unit 96. The selection unit 96 selects the first control signal based on the selection signal and feeds the second control signal associated with the selection to the second local oscillator 92. As a result, the second local oscillator 92 outputs the second local oscillation signal subjected to AFC control. This prevents unnecessary signals from being contained in the detection signal even when the oscillation frequency of the second local oscillation signal is within the demodulation band.

In essence, the control unit 94 varies the frequency of the second oscillation signal by generating the selection signal for causing the first local oscillation signal to be selected when a carrier is not detected. Meanwhile, the control unit 94 stops modulating the frequency of the second local oscillation signal by switching to the selection signal for causing the first control signal to be selected when a carrier is detected.

Figure 10:
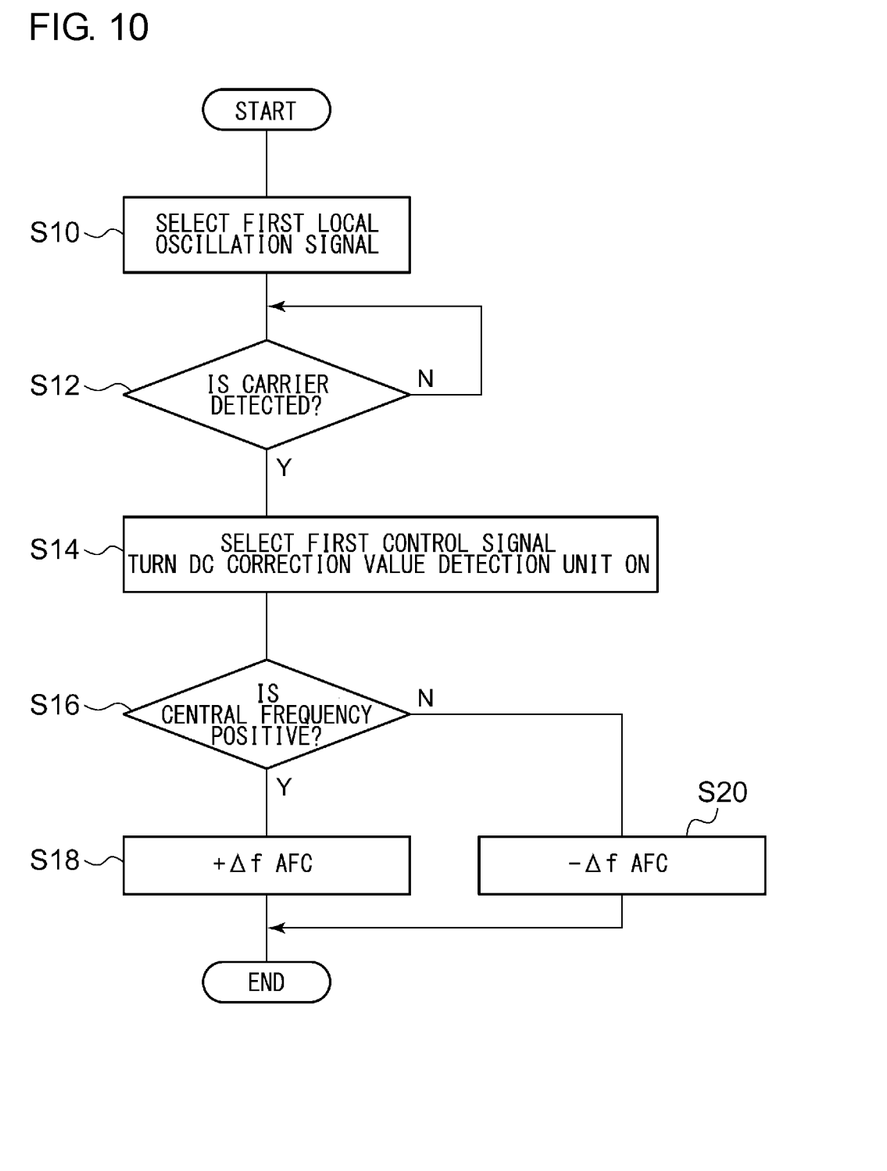
FIG. 10 is a flowchart showing the steps of control by the reception device of FIG. 9.

A description will now be given of the operation of the reception device 100 having the configuration described above. FIG. 10 is a flowchart showing the steps of control by the reception device 100. The selection unit 96 selects the first local oscillation signal (S10). If the control unit 94 does not detect a carrier (N in S12), the system stands by. If the control unit 94 detects a carrier (Y in S12), the selection unit 96 selects the first control signal and the DC correction value detection unit 22 is turned on (S14). If the central frequency of the received signal is positive (Y in S16), the AFC unit 66 effects +Δf AFC control (S18). Meanwhile, if the central frequency of the received signal is not positive (N in S16), the AFC unit 66 effects −Δf AFC control (S20).

According to this embodiment, the second local oscillation signal subjected to FM modulation is output when an RF signal is not received. Therefore, the I signal and the Q signal are prevented from being locked to a constant value even if an unmodulated signal having the same frequency as the frequency of the second oscillation signal is received. Since the I signal and the Q signal are not locked to a constant value, the base band signal is prevented from being completely suppressed. Further, the first control signal is output when an RF signal is received. Therefore, the demodulated signal is prevented from containing unnecessary signal even if the oscillation frequency of the second local oscillation signal is within the demodulation band.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An FM reception device comprising:
    a modulation frequency generation unit that generates a modulation signal of a predetermined frequency;
    a local oscillator that outputs a local oscillation signal frequency-modulated by using the modulation signal from the modulation frequency generation unit;
    a quadrature detection unit that subjects an FM signal to quadrature detection by using the local oscillation signal output from the local oscillator and outputs a base band signal;
    a reduction unit that reduces a direct current component contained in the base band signal output from the quadrature detection unit;
    a correction unit that restores the direct current component by correcting the base band signal such that the base band signal is centered around an origin of a polar coordinate system on an IQ plane;
    an FM detection unit that subjects the base band signal corrected by the correction unit to FM detection and generates a detection signal;
    an addition unit that smoothes the detection signal generated in the FM detection unit and adds an offset to the detection signal;
    an Auto Frequency Controller (AFC) unit that generates a first control signal for controlling a frequency of the local oscillation signal based on the smoothed detection signal to which the offset is added;
    a selection unit that selects one of the first control signal from the AFC unit and the modulation signal from the modulation frequency generation unit as a second control signal and outputs the selected second control signal to the local oscillator; and
    a control unit that generates a selection signal indicating a signal that should be selected in the selection unit, based on the detection signal generated in the FM detection unit.

2. The FM reception device according to claim 1, wherein the control unit includes a means to detect a carrier in the detection signal generated in the FM detection unit, the control signal generating the selection signal that causes the first control signal to be selected when a carrier is detected and causes the modulation signal from the modulation frequency generation unit to be selected when a carrier is not detected.

3. An FM reception method comprising:
    outputting a modulation signal of a predetermined frequency;
    subjecting an FM signal to quadrature detection by using a local oscillation signal and outputting a base band signal;
    reducing a direct current component contained in the base band signal;

restoring the direct current component by correcting the base band signal such that the base band signal is centered around an origin of a polar coordinate system on an IQ plane;

subjecting the corrected base band signal to FM detection and generating a detection signal;

adding an offset to the generated detection signal;

generating a control signal for controlling a frequency of the local oscillation signal based on the detection signal to which the offset is added; and selecting one of the control signal and the modulation signal according to a selection signal generated based on the detection signal and outputting the selected signal to the local oscillator.

4. The FM reception method according to claim 3, further comprising:

detecting a carrier in the detection signal, wherein the selection signal causes the control signal to be selected when a carrier is detected and causes the modulation signal to be selected when a carrier is not detected.

\* \* \* \* \*